United States Patent Office 2,795,820
Patented June 18, 1957

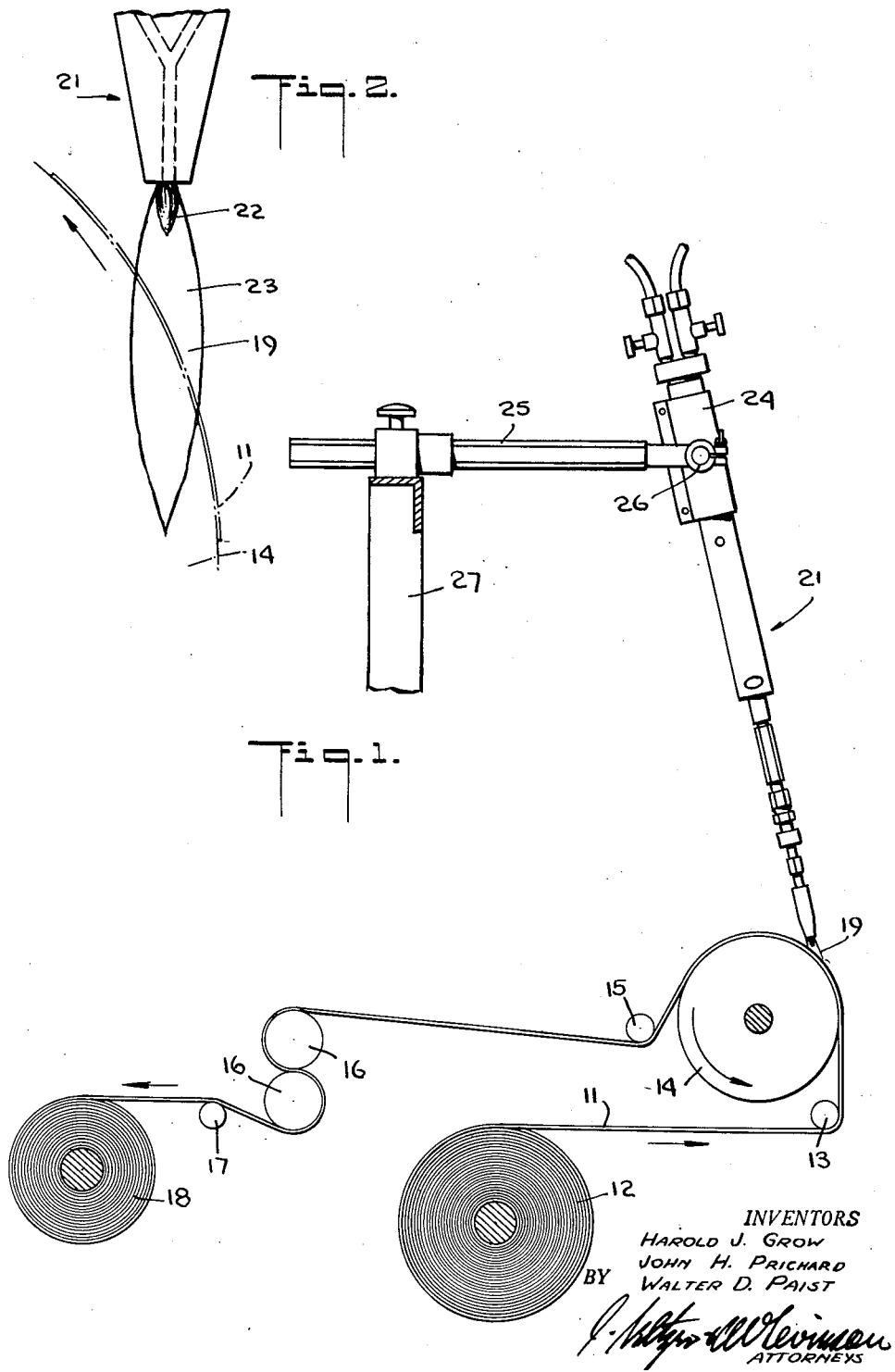

2,795,820

TREATMENT OF POLYETHYLENE

Harold J. Grow, East Orange, John H. Prichard, Springfield, and Walter D. Paist, Berkley Heights, N. J., assignors to Celanese Corporation of America, New York, N. Y., a corporation of Delaware Application November 2, 1954, Serial No. 466,352

11 Claims. (Cl. 18—48)

This invention relates to the treatment of polyethylene and relates more particularly to an improved process for the flame treatment of polyethylene surfaces to improve their characteristics.

When a polyethylene surface is printed with conventional printing inks, the printed matter does not have a strong adhesion to the polyethylene surface and tends to break away from said surface with normal handling. Some improvement has been obtained in the adhesion of the printed matter to the polyethylene surface by subjecting said surface to a treatment with an open flame. However, the results obtained with prior flame treatments have not been completely satisfactory for various reasons including the limited range of treating speeds at which a satisfactory product could be obtained, the poor aging characteristics of the flame-treated polyethylene surface with respect to its ink adhesion, and the loss in sealing strength when a treated surface was sealed by heat and pressure to another polyethylene surface, whether flame treated or not, either immediately after the flame treatment or after extended aging. The poor heat-sealing characteristics of the flame-treated polyethylene surface is especially objectionable in those cases where the flame treatment is applied to the surface of a polyethylene film since such film is normally converted to a bag, wrapping, or other structure by means of a plurality of heat-sealing operations involving both the sealing of a treated to an untreated surface and also the sealing of treated surfaces to one another.

It is an important object of this invention to provide a process for the treatment of a polyethylene surface which will be free from the foregoing and other disadvantages.

A further object of this invention is to provide an improved process for the flame treatment of a polyethylene surface to improve its surface characteristics which will yield a product having superior characteristics.

Other objects of this invention will be apparent from the following detailed description and claims.

According to the present invention, a polyethylene surface is flame treated for a short time with a flame having a temperature of at least about 4000° F. and preferably between about 4200 and 5000° F. and then cooled rapidly before the object being treated can distort. The flame is so positioned with respect to the polyethylene surface that the latter passes through the secondary cone of said flame at a point between the tip of the primary cone and about ½ to 2½ primary cone lengths, or preferably about 1 primary cone length spaced from said tip. In addition, the flame is so inclined with respect to the polyethylene surface that the said surface is bathed by the secondary cone of the treating flame and is thereby preheated before passing through the treating zone. Advantageously, in carrying out the treatment, the polyethylene surface and the flame are positioned with respect to one another in such a manner that the products of combustion, such as water vapor, spill away from and do not condense on the polyethylene surface so that no drying of the latter is necessary.

The treatment of polyethylene surface in accordance with this invention may be carried out over a relatively wide range of treating speeds or treating times. In addition, extremely high treating speeds or short treating times may be used so that a given piece of treating equipment can treat a large area of polyethylene surfaces. The treated polyethylene surfaces show good ink adhesion both immediately after the flame treatment and after extended aging. The heat-sealing characteristics of the treated surfaces are excellent so that said surfaces may be readily sealed to other polyethylene surfaces, whether flame treated or not, to form a strong bond.

One of the outstanding features of this invention is the extremely rapid transfer of heat by reason of the high temperature flame. This heating is so fast with the high temperature flame, together with the high speed of the moving film, that only the surface of the film is heated, while the remainder of the film does not soften and distort, as would be the case with a flame of greater size but lower temperature.

In a preferred manner of carrying out this invention, the treating flame is produced by burning a mixture of oxygen and a fuel gas such as propane, butane, ethane, ethylene, acetylene, natural gas, or a mixture of such gases. The use of an oxygen-fuel gas mixture enables the desired temperatures to be readily achieved with a flame having a small volume whereby important economies can be achieved in the quantities of fuel gas and oxygen that are required to treat a given surface area of the polyethylene. Also, because of the relatively small quantities of fuel gas that are burned during the treatment, the volume of the products of combustion will be at a minimum so that there will be little or no difficulty with condensation of the water vapor in such products on the polyethylene surface and no need for drying the treated surface. While the proportions of the hydrocarbon and oxygen may be regulated to give a neutral, reducing or oxidizing flame, with corresponding changes in flame temperature, the best results are achieved with a neutral or slightly reducing flame.

The process of this invention will now be described in connection with the flame treating of the surface of a polyethylene film. It should be understood, however, that the process may also be employed for treating the surface of other objects made of or coated with polyethylene to improve the adhesion to said surface of printing inks and the like.

Apparatus suitable for carrying out the process of this invention is shown in the accompanying drawing herein:

Fig. 1 is a side elevational view of the apparatus, and

Fig. 2 is a detail view, on an enlarged scale, of a portion of the apparatus shown in Fig. 1.

Referring now to the drawing, the reference numeral 11 designates a polyethylene film which is drawn from a supply roll 12 and passed around a guide roll 13 which directs the said film onto a treating roll 14 which is driven and is also cooled in any suitable manner as by passing a cooling fluid therethrough. The polyethylene film 11 then passes under a guide roll 15 and between nip rolls 16, which are positively driven in any suitable manner, and over a guide roll 17 to a take-up roll 18. As the polyethylene film 11 travels around the cooled treating roll 14, it passes through a flame 19 of a torch assembly, indicated generally by reference numeral 21. The flame 19 is formed of a primary cone 22 and a secondary cone 23. The torch assembly 21 is supported by means of a clamp 24 which permits the said assembly to be moved axially along its length. The clamp 24 is in turn fastened to a bracket 25 by means of a swivel 26, and the said bracket is adjustably secured to a pedestal 27. By the use of oxygen-fuel gas mixtures, a very small, narrow burner yielding a flame with a primary cone as short as 1/8" can be used, so that the entire unit may be placed with the flame 19 in close proximity to the polyethylene film 11.

During operation, the torch assembly 21 is adjusted with respect to the treating roll 14 in such a manner that the polyethylene film 11 will pass through the secondary cone 23 at a distance from the primary cone 22 as specified above. Fig. 2 of the drawing shows the flame 19 as it would appear when it is burning freely in air and, in broken lines, the relative position of the treating roll 14 and the polyethylene film 11 with respect to said flame. In an actual run, the flame 19 will strike the polyethylene film 11 and the secondary cone 23 will be distorted. The torch 21 is so positioned with respect to the treating roll 14 that the said roll will carry the polyethylene film 11 through a large portion of the secondary cone 23 of the flame 19 so as to preheat the said polyethylene film. In addition, the torch 21 is inclined with respect to the roll 14 so that the angle between a plane tangent to the polyethylene film 11 where the axis of the flame 19 intersects the said film and a plane passing through the axis of the flame 19 and transverse to the length of the said polyethylene film will be greater than 10° and preferably between 20 and 80° when measured from the side from which the polyethylene film leaves the flame. It has been found that when the torch 21 is inclined in this manner, the stability of the flame 19 is at a maximum as is the uniformity of the treatment. When the torch 21 is not so inclined, there is a tendency for the air currents produced by the movement of the polyethylene film 11 to cause the flame 19 to waver with the result that the uniformity of treatment is impaired.

The following examples are given to illustrate this invention further.

*Example I*

A polyethylene film is treated with a neutral oxygen-propane flame having a temperature of 4700° F. in the apparatus shown in the drawing with the polyethylene film passing through the secondary cone of the flame, one cone length from the tip of the primary cone. In this apparatus, the burner tip comprises a single row of individual flames spaced 1/8" apart and having an orifice diameter of approximately 0.025". Satisfactory ink adhesion and heat seals are obtained with treating speeds ranging from 210 to 680 feet per minute. The slip and blocking characteristics of the treated film are excellent. When the temperature of the treating flame is reduced to 2600° F., substituting air for oxygen and using suitable burner equipment for this fuel gas-air mixture, satisfactory ink adhesion was observed over a narrow range of treating speeds, but heat sealing was unsatisfactory either initially or after aging (three months at 70–80° F. or seven days at 110° F.).

*Example II*

The polyethylene film treated with the oxygen-propane flame is aged at 110° F. and retains its ink adhesion and ability to heat seal after 30 days of aging.

*Example III*

A polyethylene film is treated with a slightly reducing flame produced by the combustion of propane in oxygen and having a temperature of 4400° F., with the film passing through the secondary cone of the flame two cone lengths from the tip of the primary cone. Good ink adhesion and heat sealability is obtained with treating speeds between 350 and 600 feet per minute. Both ink adhesion and heat sealability were still satisfactory after aging for 6 months at 70–80° F. or 20 days at 110° F.

It is to be understood that the foregoing detailed description is given merely by way of illustration and that many variations may be made therein without departing from the spirit of our invention.

Having described our invention, what we desire to secure by Letters Patent is:

1. Process for treating a polyethylene surface to improve its ink adhesion which comprises flame treating said polyethylene surface by passing said surface through the secondary cone of a flame at a point 1/2 to 2 1/2 primary cone lengths from the tip of the primary cone of said flame, said flame having a temperature of 4200 to 5000° F. and being formed by burning a mixture consisting of a hydrocarbon fuel gas and oxygen.

2. Process as set forth in claim 1 in which said hydrocarbon fuel gas is selected from a group consisting of propane, butane, ethane, ethylene, acetylene and natural gas.

3. Process as set forth in claim 1 in which said fuel gas is propane.

4. Process for treating the surface of a polyethylene film which comprises passing said polyethylene film around a cooled roll and flame treating the surface of the film, while the film is on the roll, by passing said surface through the secondary cone of a flame at a point 1/2 to 2 1/2 primary cone lengths from the tip of the primary cone of said flame, said flame having a temperature of 4200 to 5000° F. and being formed by burning a mixture consisting of a hydrocarbon fuel gas and oxygen.

5. Process as set forth in claim 4 in which said hydrocarbon fuel gas is selected from a group consisting of propane, butane, ethane, ethylene, acetylene and natural gas.

6. Process as set forth in claim 4 in which said fuel gas is propane.

7. Process as set forth in claim 4 in which the axis of the flame is inclined to the treating roll so that the angle between a plane tangent to the polyethylene film where the axis of the flame intersects said film and a plane passing through said axis and transverse to the length of the film is an acute angle greater than 10° when measured from the side from which the film leaves the flame.

8. Process as set forth in claim 7 in which said angle is 20 to 80°.

9. Process as set forth in claim 8 in which said fuel gas is propane.

10. Process as set forth in claim 1 in which the axis of the flame is inclined so that the angle between a plane tangent to the polyethylene surface where the axis of the flame intersects said surface and a plane passing through said axis and transverse to the length of the surface is an acute angle greater than 10° when measured from the side from which the surface leaves the flame.

11. Process as set forth in claim 10 in which said angle is 20 to 80°.

References Cited in the file of this patent

UNITED STATES PATENTS

| 2,632,921 | Kreidl | Mar. 31, 1953 |
| 2,648,097 | Kritchever | Aug. 11, 1953 |
| 2,683,894 | Kritchever | July 20, 1954 |
| 2,704,382 | Kreidl | Mar. 22, 1955 |